(12) United States Patent
Arrighi

(10) Patent No.: US 9,301,503 B1
(45) Date of Patent: Apr. 5, 2016

(54) AUTOMATIC BALL-THROWING DEVICE

(71) Applicant: Chandler A. Arrighi, Sacramento, CA (US)

(72) Inventor: Chandler A. Arrighi, Sacramento, CA (US)

(*) Notice: Subject to any disclaimer, the term of this patent is extended or adjusted under 35 U.S.C. 154(b) by 0 days.

(21) Appl. No.: 14/487,712

(22) Filed: Sep. 16, 2014

(51) Int. Cl.
| | |
|---|---|
| *A01K 15/00* | (2006.01) |
| *A63B 69/40* | (2006.01) |
| *F41B 4/00* | (2006.01) |
| *A01K 15/02* | (2006.01) |
| *A63B 65/12* | (2006.01) |

(52) U.S. Cl.
CPC ............... *A01K 15/025* (2013.01); *A63B 65/12* (2013.01); *A63B 69/406* (2013.01); *F41B 4/00* (2013.01); *A63B 2208/14* (2013.01)

(58) Field of Classification Search
CPC .. A63B 69/406; A63B 2208/12; A63B 69/40; A63B 2208/14; A01K 15/02; A01K 15/025; F41B 4/00
USPC ......... 124/6, 7, 51.1, 78, 81, 1; 473/422, 431, 473/451; 119/707
See application file for complete search history.

(56) References Cited

U.S. PATENT DOCUMENTS

| | | | | | |
|---|---|---|---|---|---|
| 2,705,945 | A | * | 4/1955 | Cavalier | A63B 69/406 124/6 |
| 3,611,996 | A | * | 10/1971 | Wegner | A01K 15/027 119/707 |
| 3,713,658 | A | * | 1/1973 | Cook | A63B 69/406 124/1 |
| 3,777,732 | A | * | 12/1973 | Holloway | A63B 69/406 124/50 |
| 3,844,267 | A | * | 10/1974 | Mohr | A63B 69/406 124/48 |
| 4,094,294 | A | * | 6/1978 | Speer | F41B 11/53 124/44.7 |
| 4,191,374 | A | * | 3/1980 | Kulesza | A63B 69/406 124/78 |
| 4,267,799 | A | * | 5/1981 | Bacon | A01K 5/0275 119/61.2 |
| 4,323,047 | A | * | 4/1982 | McIntosh et al. | 124/1 |
| 4,552,120 | A | * | 11/1985 | Nall | A63B 69/406 124/1 |

(Continued)

*Primary Examiner* — Alexander Niconovich

(57) ABSTRACT

The automated ball-throwing device includes a housing defining a first distal end with a ball-dropping bowl. The ball-dropping bowl is adapted to receive a ball therein. The ball-dropping bowl includes an inclined surface that extends downwardly to an interior of the housing. The interior of the housing includes a first set of guide rails that extend in parallel relationship with a portion of the inclined surface. A second set of guide rails and a conveyor belt are located inside of the housing. The second set of guide rails and the conveyor belt align adjacent to a third distal end of the inclined surface. A ball is able to roll down the inclined surface, and onto the conveyor belt. The first set of guide rails and the second set of guide rails aid the ball through the interior of the housing.

2 Claims, 5 Drawing Sheets

(56) References Cited

U.S. PATENT DOCUMENTS

| | | | | |
|---|---|---|---|---|
| 4,563,999 A * | 1/1986 | Miehlich | A63B 69/40 | 124/50 |
| 4,772,017 A * | 9/1988 | Eriksen | A63B 69/406 | 124/1 |
| 4,834,060 A * | 5/1989 | Greene | A63B 69/406 | 124/78 |
| 4,883,272 A * | 11/1989 | Lay | A63B 69/406 | 124/6 |
| 4,907,802 A * | 3/1990 | Gatin | A63B 69/408 | 124/36 |
| 4,995,374 A * | 2/1991 | Black | A01K 15/025 | 124/32 |
| 5,107,820 A * | 4/1992 | Salansky | A63B 69/40 | 124/48 |
| 5,125,653 A * | 6/1992 | Kovacs et al. | | 124/78 |
| 5,160,131 A * | 11/1992 | Leon | A63B 69/409 | 124/56 |
| 5,265,583 A * | 11/1993 | Otto | A63B 69/40 | 124/26 |
| 5,396,876 A * | 3/1995 | Liscio | A63B 69/406 | 124/34 |
| 5,417,196 A * | 5/1995 | Morrison | A63B 69/40 | 124/6 |
| 6,176,230 B1 * | 1/2001 | Thompson | A63B 69/407 | 124/16 |
| 6,190,271 B1 * | 2/2001 | Rappaport | A63B 69/0002 | 124/78 |
| 6,443,859 B1 * | 9/2002 | Markin | A63B 69/406 | 124/6 |
| 6,488,020 B1 * | 12/2002 | Rosas-Magallan | A63B 69/406 | 124/78 |
| 6,514,162 B1 * | 2/2003 | Karellas | A63B 47/002 | 124/16 |
| 6,604,517 B1 * | 8/2003 | Chao | A63B 69/407 | 124/16 |
| 6,637,422 B2 * | 10/2003 | Wojtkiewicz | F41B 4/00 | 124/51.1 |
| 6,752,138 B2 * | 6/2004 | Taryoto | | 124/78 |
| 6,772,745 B2 * | 8/2004 | McEachen | A63B 69/406 | 124/51.1 |
| 6,877,501 B2 * | 4/2005 | Wojtkiewicz et al. | | 124/78 |
| 6,880,542 B1 * | 4/2005 | Johndreau et al. | | 124/78 |
| 7,066,845 B2 * | 6/2006 | Joseph | A63B 69/0071 | 124/78 |
| 7,111,620 B2 * | 9/2006 | Johndreau et al. | | 124/51.1 |
| 7,114,465 B1 * | 10/2006 | Winter | A63B 65/12 | 119/707 |
| 7,207,893 B1 * | 4/2007 | Louie | A63B 63/00 | 473/166 |
| 7,237,546 B2 * | 7/2007 | Nozato | | 124/78 |
| 7,263,953 B2 * | 9/2007 | Sundararajan | A01K 5/0275 | 119/496 |
| 7,278,934 B2 * | 10/2007 | McBride | A63B 63/00 | 124/78 |
| 7,350,515 B2 * | 4/2008 | Yao | A63B 47/002 | 124/49 |
| 7,445,003 B2 * | 11/2008 | Smith | A63B 69/406 | 124/78 |
| 7,553,244 B2 * | 6/2009 | York | A63B 69/40 | 124/78 |
| 7,753,375 B1 * | 7/2010 | Neal | A63B 63/083 | 273/317 |
| D641,437 S | 7/2011 | Nugent | | |
| 8,550,063 B2 * | 10/2013 | Alger | A63B 69/406 | 124/6 |
| 8,893,698 B2 * | 11/2014 | Boehner | A63B 69/406 | 124/78 |
| 9,022,016 B1 * | 5/2015 | Hafer | F41B 4/00 | 124/6 |
| 2003/0006319 A1 * | 1/2003 | Silverstein | A62C 3/025 | 239/672 |
| 2011/0303208 A1 * | 12/2011 | Taylor | A01K 15/02 | 124/54 |
| 2013/0104870 A1 * | 5/2013 | Rizzo | A63B 69/40 | 124/78 |
| 2013/0228138 A1 * | 9/2013 | Hamill | A01K 15/025 | 119/707 |
| 2014/0109887 A1 * | 4/2014 | Edson | A63B 69/406 | 124/78 |

* cited by examiner

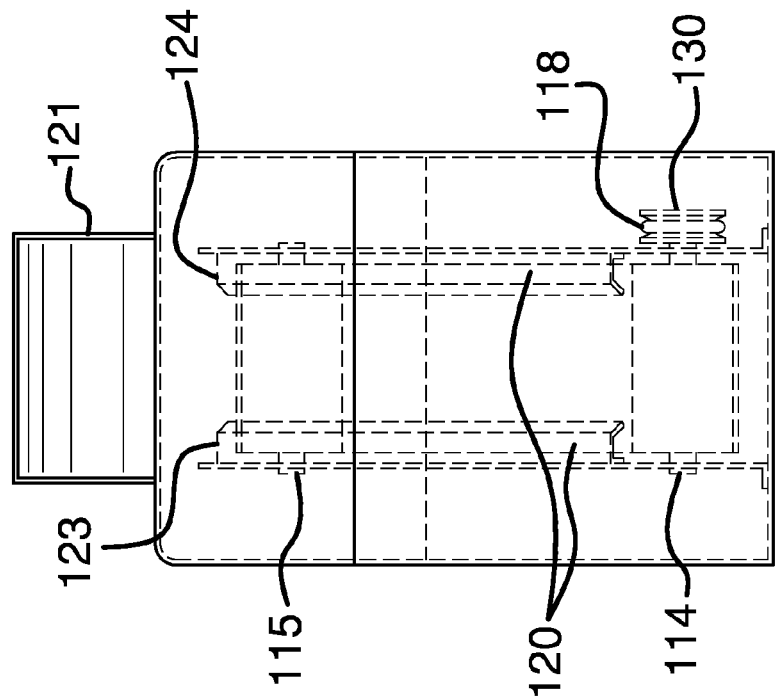
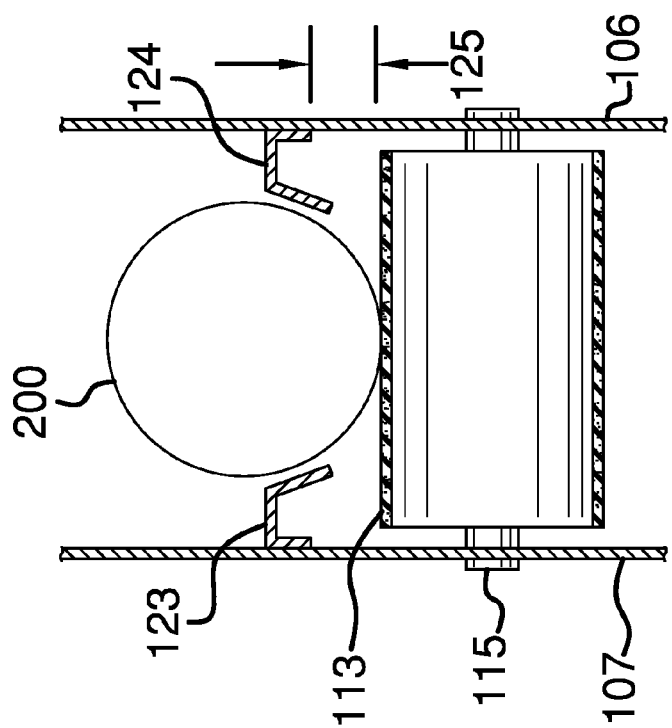

US 9,301,503 B1

AUTOMATIC BALL-THROWING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of automated ball-throwing devices, more specifically, an automated ball-throwing device that is configured to interact with a dog.

SUMMARY OF THE INVENTION

An embodiment of the disclosure meets the needs presented above by generally comprising a housing defining a first distal end with a ball-dropping bowl. The ball-dropping bowl is adapted to receive a ball therein. The ball-dropping bowl includes an inclined surface that extends downwardly to an interior of the housing. The interior of the housing includes a first set of guide rails that extend in parallel relationship with a portion of the inclined surface. A second set of guide rails and a conveyor belt are located inside of the housing. The second set of guide rails and the conveyor belt align adjacent to a third the inclined surface, and onto the conveyor belt. The first set of guide rails and the second set of guide rails aid the ball through the interior of the housing. The conveyor belt accelerates the ball upwardly within the housing to an exit chute located at an upper, rear distal end of the housing. The ball is accelerated up the conveyor belt, and bounces against the exit chute, and is projected upwardly away from the housing. The ball is projected upwardly as well as forwardly over the first distal end. The conveyor belt is powered via a belt and motor located elsewhere inside of the housing.

These together with additional objects, features and advantages of the automated ball-throwing device will be readily apparent to those of ordinary skill in the art upon reading the following detailed description of presently preferred, but nonetheless illustrative, embodiments of the automated ball-throwing device when taken in conjunction with the accompanying drawings.

In this respect, before explaining the current embodiments of the automated ball-throwing device in detail, it is to be understood that the automated ball-throwing device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the automated ball-throwing device.

It is therefore important that the claims be regarded as including such equivalent construction insofar as they do not depart from the spirit and scope of the automated ball-throwing device. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 4 is a cross-sectional view along line 4-4 in FIG. 3.

FIG. 5 is an end view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
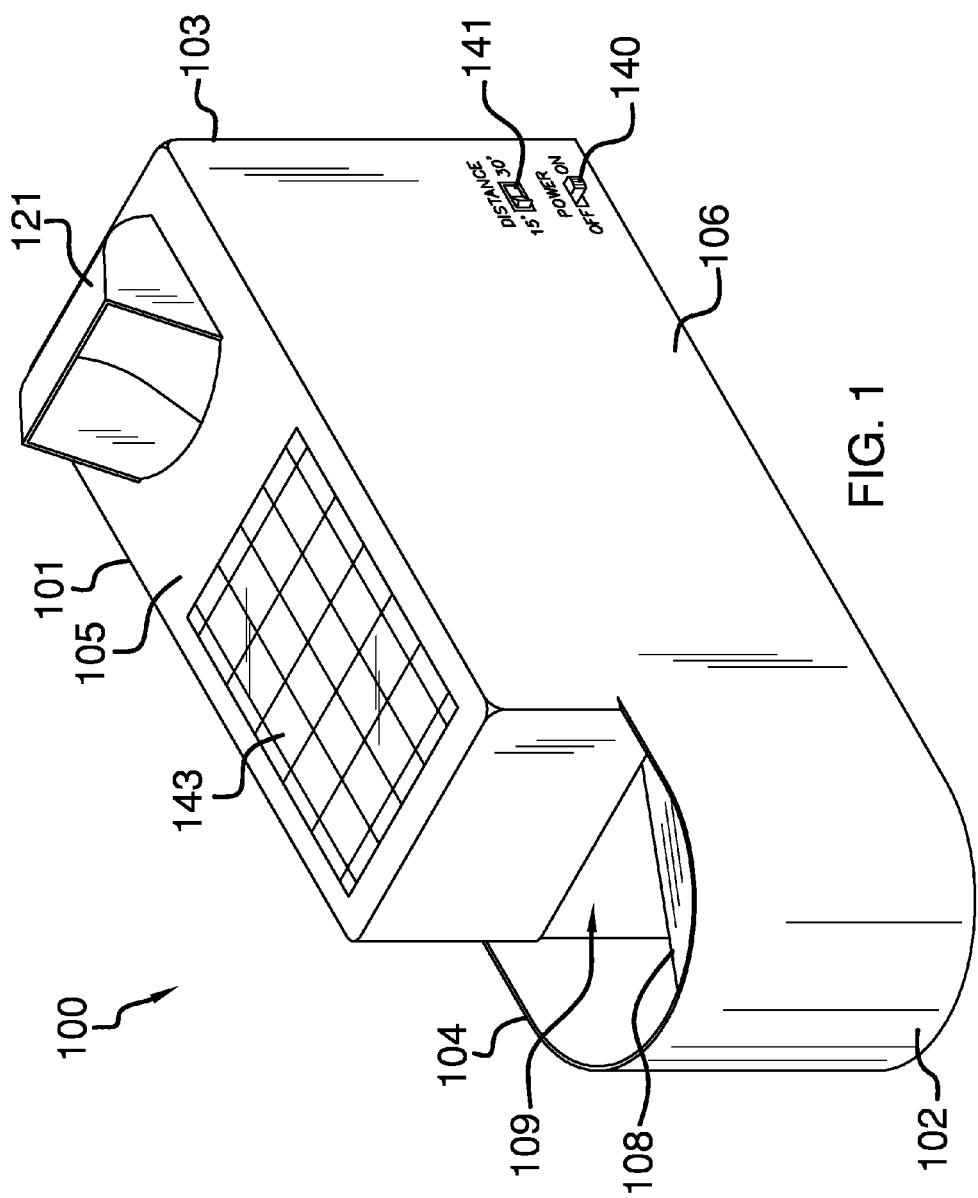
FIG. 1 is a first perspective view of an embodiment of the disclosure.
Figure 2:
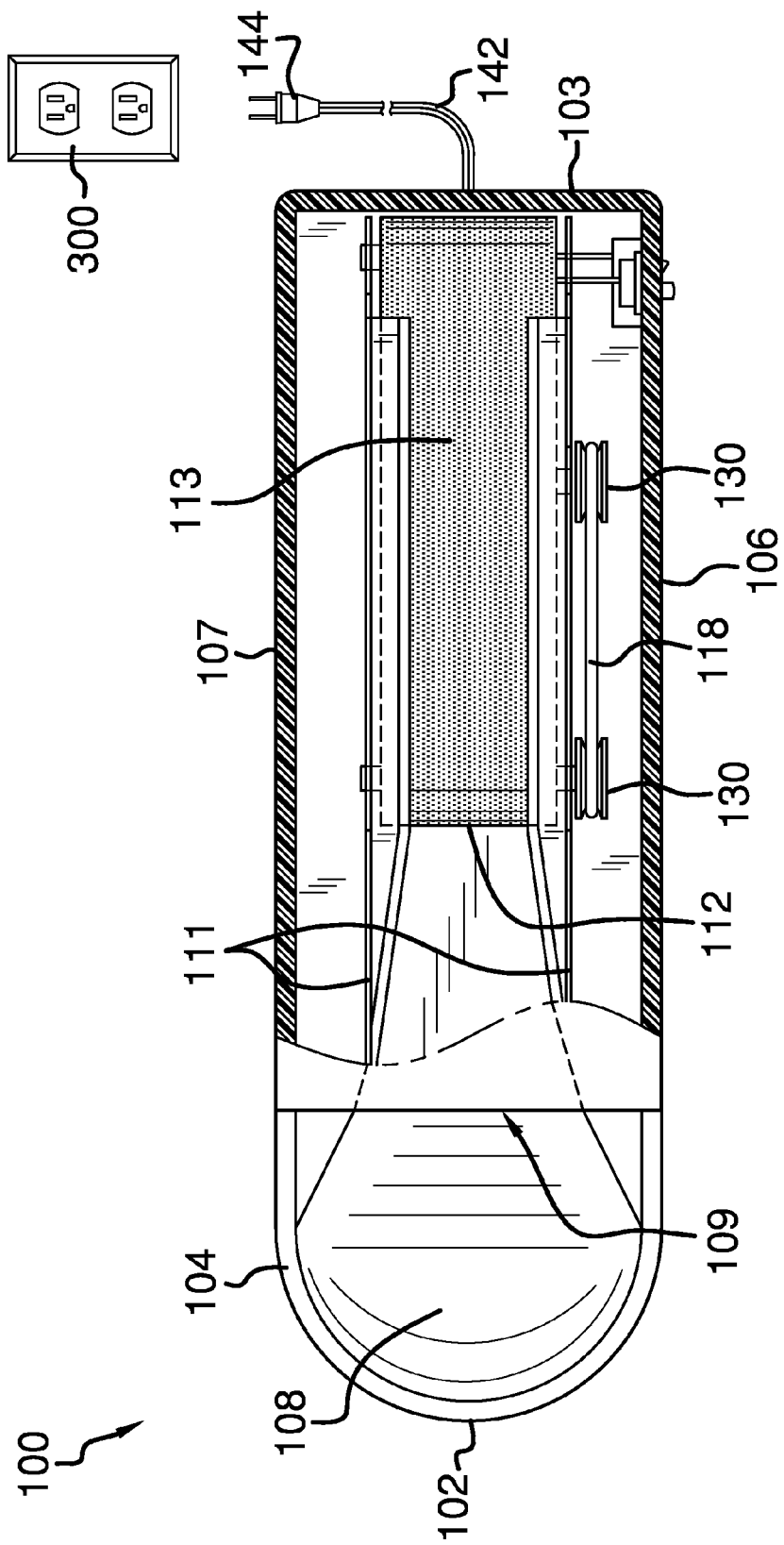
FIG. 2 is a top view of an embodiment of the disclosure.
Figure 3:
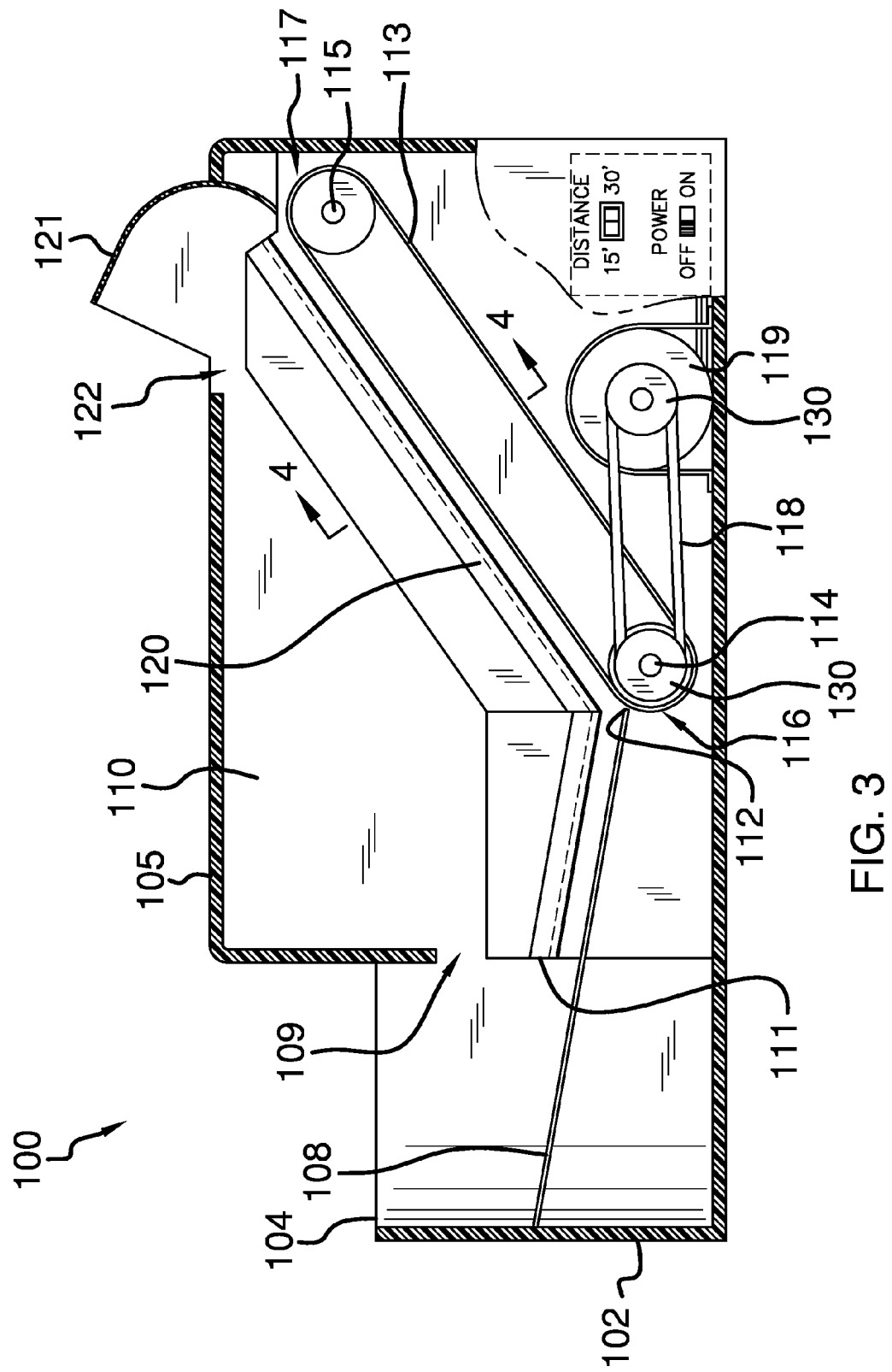
FIG. 3 is a side cut-away view of an embodiment of the disclosure.
Figure 6:
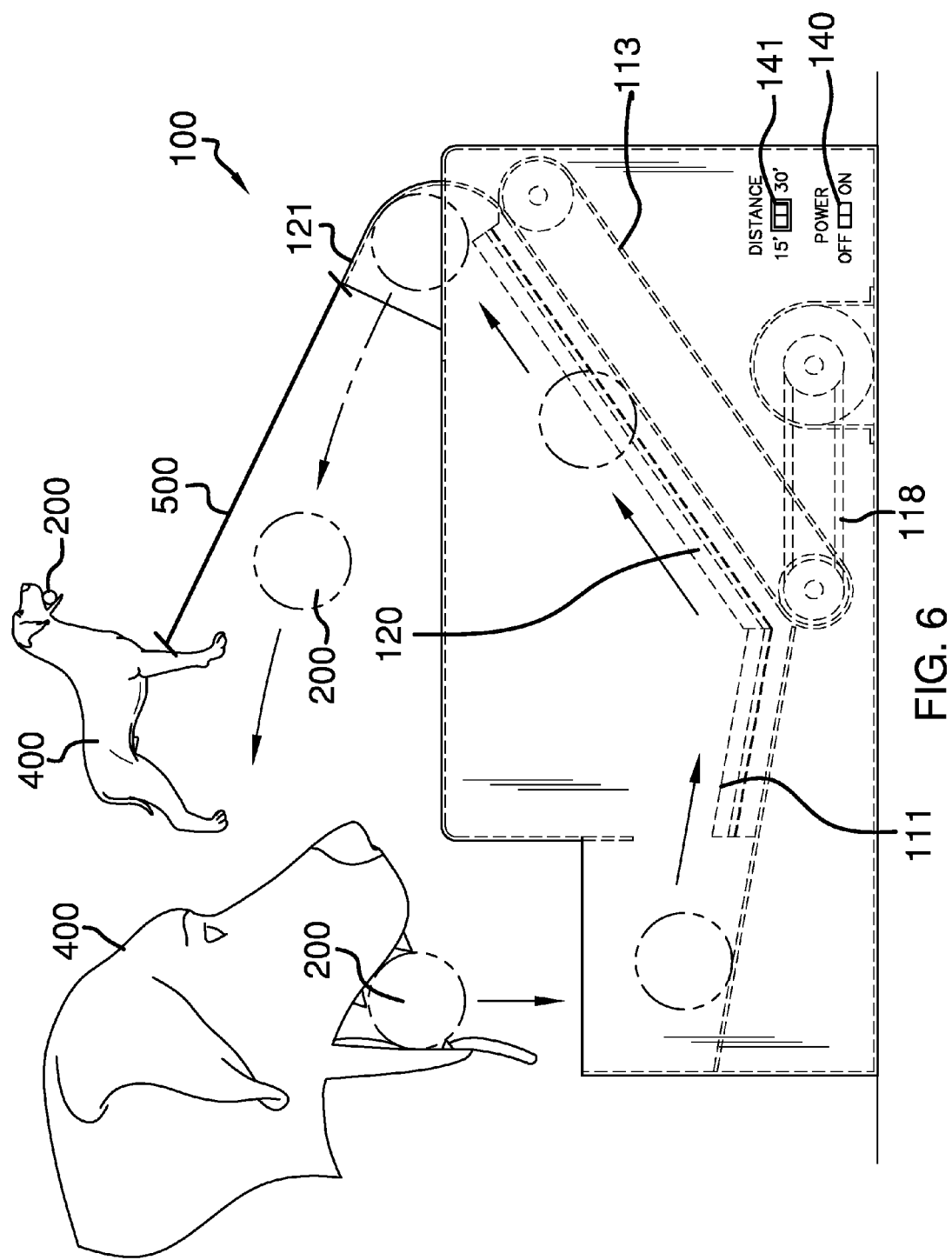
FIG. 6 is a detailed side view of an embodiment of the disclosure in use.

As best illustrated in FIGS. 1 through 6, the automated ball-throwing device 100 (hereinafter invention) generally comprises a housing 101 defined with a first distal end 102 and a second distal end 103. The housing 101 includes a ball-dropping bowl 104 at the first distal end 102. The housing 101 is further defined with a top housing surface 105, a left housing side 106, and a right housing side 107.

The ball-dropping bowl 104 includes an inclined surface 108 that extends into a housing inlet 109. Moreover, the inclined surface 108 of the ball-dropping bowl 104 extends to an interior 110 of the housing 101. The inclined surface 108 includes a first set of guide rails 111 that extend from the housing inlet 109 to an inclined surface distal end 112. The ball-dropping bowl 104 is configured to receive a ball 200 that may be dropped via a dog 400.

A conveyor belt 113 is also included in the interior of the housing 101. The conveyor belt 113 extends adjacent the inclined surface distal end 112 upwardly, and towards the second distal end 103 of the housing 101. The conveyor belt 113 includes a first drum 114 and a second drum 115. The first drum 114 is located at a first conveyor distal end 116, and the second drum 115 is located at a second conveyor distal end 117. The first drum 114 is rotated via a belt 118 that extends to a motor 119. Both the first drum 114 and the motor 119 include a pulley 130, which enables the belt 118 to transfer rotational movement.

A second set of guide rails 120 is positioned adjacent and parallel with the conveyor belt 113. The first set of guide rails 111 and the second set of guide rails 120 are adapted to assist in moving a ball 200 through the interior of the housing 101. The ball 200 falls down the inclined surface 108, until the ball 200 reaches the conveyor belt 200. Once the ball 200 reaches the conveyor belt 113, the conveyor belt 113 accelerates the ball 200 towards an exit chute 121. The exit chute 121 is provided on the top surface 105 of the housing 101. Moreover, the exit chute 121 is located adjacent the second distal end 103 of the housing 101.

The exit chute 121 has a curvature, which enables the acceleration of the ball 200 to be bounced forwardly with respect to the housing 101. Moreover, the ball 200 accelerates up the conveyor belt 113, and bounces off of the exit chute 121. The ball 200 is projected over the ball-dropping bowl 104. Moreover, the ball 200 is protected a distance 500 away from the housing 101 in order for said dog 400 to retrieve the ball 200. The top surface 105 of the housing 101 includes a top outlet 122 that accommodates the exit chute 121.

The first set of guide rails 111 have a similar construction as the second set of guide rails 120. Moreover, both the first set of guide rails 111 and the second set of guide rails 120 are further defined a left guide rail member 123 and a right guide rail member 124. The left guide rail member 123 and the right guide rail member 124 are positioned a guide rail height 125 above the inclined surface 108 or the conveyor belt 113. Both the left guide rail member 123 and the right guide rail member 124 have an inverted "U" cross-section (see FIG. 4).

The motor 119 is wired to an on/off switch 140, and a distance switch 141. The on/off switch 140 is in wired communication to either an electrical cord 142 and/or a solar cell 143. The distance switch 141 shall adjust the distance 500 the ball 200 is projected from the housing 101. The electrical cord 142 includes an electrical plug 144 that is adapted to be inserted into a standard electrical outlet 300. The electrical plug 144 and the electrical cord 42 are responsible for supplying electricity to the invention 100. The solar cell 143 may be one of a plurality of solar cells 143. Moreover, the solar cell 143 is located on the top surface 105 of the housing 101, and generates electricity for use with the invention 100.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An automated ball-throwing device comprising:
a housing from which a ball-dropping bowl is integrated;
said ball-dropping bowl is configured to receive a ball that is dropped via a dog;
said ball is directed to a conveyor belt located in an interior of the housing;
said conveyor belt accelerates said ball, which is projected a distance away from the housing via an exit chute;
wherein the housing is further defined with a first distal end and a second distal end; wherein the housing includes the ball-dropping bowl at the first distal end;
wherein the housing is further defined with a top housing surface, a left housing side, and a right housing side;
wherein the ball-dropping bowl includes an inclined surface that extends into a housing inlet; wherein the inclined surface of the ball-dropping bowl extends to an interior of the housing;
wherein the inclined surface includes a first set of guide rails that extend from the housing inlet to an inclined surface distal end;
wherein the exit chute is provided on the top surface of the housing; wherein the exit chute is located adjacent the second distal end of the housing; wherein the exit chute has a curvature, which enables the acceleration of the ball to be bounced forwardly with respect to the housing;
wherein the conveyor belt includes a first drum and a second drum; wherein the first drum is located at a first conveyor distal end, and the second drum is located at a second conveyor distal end;
wherein the first drum is rotated via a belt that extends to a motor; wherein both the first drum and the motor include a pulley, which enables the belt to transfer rotational movement;
wherein the motor is wired to an on/off switch, and a distance switch;
wherein the ball-dropping bowl is configured to receive a ball that may be dropped via the dog; wherein the conveyor belt extends adjacent the inclined surface distal end upwardly, and towards the second distal end of the housing;
wherein a second set of guide rails is positioned adjacent and parallel with the conveyor belt;
wherein the first set of guide rails and the second set of guide rails are adapted to assist in moving the ball through the interior of the housing; wherein the ball falls down the inclined surface, until the ball reaches the conveyor belt; wherein once the ball reaches the conveyor belt, the conveyor belt accelerates the ball towards the exit chute;
wherein the ball accelerates up the conveyor belt, and bounces off of the exit chute; wherein the ball is projected over the ball-dropping bowl; wherein the top surface of the housing includes a top outlet that accommodates the exit chute;
wherein the first set of guide rails and the second set of guide rails are each further defined a left guide rail member and a right guide rail member;
wherein the left guide rail member and the right guide rail member are positioned a guide rail height above the inclined surface or the conveyor belt;
wherein the distance switch shall adjust the distance the ball is projected from the housing;
wherein the electrical cord includes an electrical plug that is adapted to be inserted into a standard electrical outlet;
wherein the electrical plug and the electrical cord are responsible for supplying electricity to the motor.

2. The automated ball-throwing device according to claim 1 wherein the at least one solar cell is located on the top surface of the housing, and generates electricity for use with the motor.

* * * * *